US012798856B2

(12) United States Patent
De Vreese et al.

(10) Patent No.: US 12,798,856 B2
(45) Date of Patent: Nov. 17, 2026

(54) BAG IN BOX CONNECTOR VALVE

(71) Applicant: THE COCA-COLA COMPANY, Atlanta, GA (US)

(72) Inventors: Bert De Vreese, Brussels (BE); Jan De Paepe, Kruibeke (BE); Stefan Vandervelden, Kruibeke (BE); Johan Meuris, Kruibeke (BE)

(73) Assignee: THE COCA-COLA COMPANY, Atlanta, GA (US)

( * ) Notice: Subject to any disclaimer, the term of this patent is extended or adjusted under 35 U.S.C. 154(b) by 130 days.

(21) Appl. No.: 18/722,889

(22) PCT Filed: Jan. 3, 2023

(86) PCT No.: PCT/US2023/010017
§ 371 (c)(1),
(2) Date: Jun. 21, 2024

(87) PCT Pub. No.: WO2023/133085
PCT Pub. Date: Jul. 13, 2023

(65) Prior Publication Data

US 2025/0058952 A1 Feb. 20, 2025

Related U.S. Application Data

(60) Provisional application No. 63/266,372, filed on Jan. 4, 2022.

(51) Int. Cl.
*B65D 77/06* (2006.01)
*B67D 1/08* (2006.01)

(52) U.S. Cl.
CPC ......... *B65D 77/067* (2013.01); *B67D 1/0809* (2013.01); *B67D 2001/0827* (2013.01)

(58) Field of Classification Search
CPC .......... B67D 1/0809; B67D 2001/0827; B67D 77/067
See application file for complete search history.

(56) References Cited

U.S. PATENT DOCUMENTS 3,822,614 A * 7/1974 Kovacevic ................ B67B 7/18
81/3.42
4,133,565 A * 1/1979 Shutt ..................... F16L 47/041
285/334.5

(Continued)

FOREIGN PATENT DOCUMENTS

CN 204962124 U 1/2016
EP 0 790 957 B1 4/2003

(Continued)

OTHER PUBLICATIONS

Machine Translation of JP-H06123392.*

(Continued)

*Primary Examiner* — Jeremy Carroll
(74) *Attorney, Agent, or Firm* — Eversheds Sutherland (US) LLP

(57) ABSTRACT

The present application provides a bag in box connection valve for a pouch spout connected to a flexible pouch of a bag in box. The bag in box connection valve may include a ratchet body with a pair of ratchet teeth lines, a quick disconnect ratchet coupling with a spout opening, and a pair of ratchet arms with a pair of ratchet arm teeth lines. The pair of ratchet teeth line and the pair of ratchet arm teeth lines cooperate to raise and lower the ratchet body onto the pouch spout positioned within the spout opening.

9 Claims, 4 Drawing Sheets

(56) References Cited

U.S. PATENT DOCUMENTS

| | | | | | |
|---|---|---|---|---|---|
| 4,421,146 | A | * | 12/1983 | Bond | B65D 77/06 251/291 |
| 4,947,711 | A | * | 8/1990 | Giebeler | B67B 7/066 81/3.29 |
| 5,477,883 | A | | 12/1995 | Totten | |
| 2019/0063657 | A1 | | 2/2019 | Mitchell | |
| 2020/0318768 | A1 | * | 10/2020 | Tickle | F16L 37/12 |

FOREIGN PATENT DOCUMENTS

| | | | | | |
|---|---|---|---|---|---|
| GB | 491456 | A | | 9/1938 | |
| GB | 2183617 | A | * | 6/1987 | B65D 77/067 |
| JP | H06123392 | A | * | 5/1994 | |
| WO | WO-2013139374 | A1 | * | 9/2013 | A61M 39/24 |

OTHER PUBLICATIONS

Machine translation of WO-2013139374-A1.*
Extended European Search Report for EP 23737514.2, dated Nov. 12, 2025 (9 pp.).
Supplementary European Search Report for EP 23737514.2, dated Dec. 2, 2025 (1 p.).
International Search Report and Written Opinion for PCT/US2023/010017, dated Apr. 28, 2023 (7 pp.).

* cited by examiner

BAG IN BOX CONNECTOR VALVE

CROSS-REFERENCE TO RELATED APPLICATIONS

This application claims priority to and benefit of U.S. provisional patent application No. 63/266,372, filed Jan. 4, 2022, which is herein incorporated by reference.

TECHNICAL FIELD

The present application and the resultant patent relate generally to beverage dispensing systems and more particularly relate to an improved bag in box connector valve that is easy to attach to a bag in box, that is easy to use, and that is easy to remove.

BACKGROUND OF THE INVENTION

Bag in box container are ubiquitous in the field of beverage dispensing. Generally described, syrups, concentrates, or other fluids are positioned with in a flexible pouch, typically a five gallon pouch. The pouch is positioned within corrugated box. The bag in box container may be shipped to retail outlet such as restaurants, gas stations, mini-marts, and the like. The corrugated box may be opened and the flexible pouch may be attached to a hose leading to a beverage dispenser and the like. The personnel in the retail outlet may be responsible for attaching and replacing the bag in box containers on a daily basis.

There is a desire to adapt existing bag in box technology for use in smaller volume venues. In this scenario, the bag in box container may have a smaller volume of fluid therein. Moreover, the customers who use such bag in box containers may not have much familiarity on how to attach and replace such containers to the beverage dispenser.

SUMMARY OF THE INVENTION

The present application and the resultant patent thus provide a bag in box connection valve for a pouch spout connected to a flexible pouch of a bag in box. The bag in box connection valve may include a ratchet body with a pair of ratchet teeth lines, a quick disconnect ratchet coupling with a spout opening, and a pair of ratchet arms with a pair of ratchet arm teeth lines. The pair of ratchet teeth line and the pair of ratchet arm teeth lines cooperate to raise and lower the ratchet body onto the pouch spout positioned within the spout opening.

attaching a quick disconnect ratchet coupling to a valve housing of a flexible pouch. The method may include the steps of sliding the quick disconnect ratchet coupling over the valve housing, aligning the quick disconnect ratchet coupling in place with the valve housing positioned between a pair of connector arms, and swinging a pair of ratchet arms of the quick disconnect ratchet coupling to drive a valve body of the quick disconnect ratchet coupling into communication with the valve body.

These and other features and improvements of the present application and the resultant patent will become apparent to one of ordinary skill in the art upon review of the following detailed description when taken in conjunction with the shown drawings and the appended claims.

DETAILED DESCRIPTION

Figure 1:
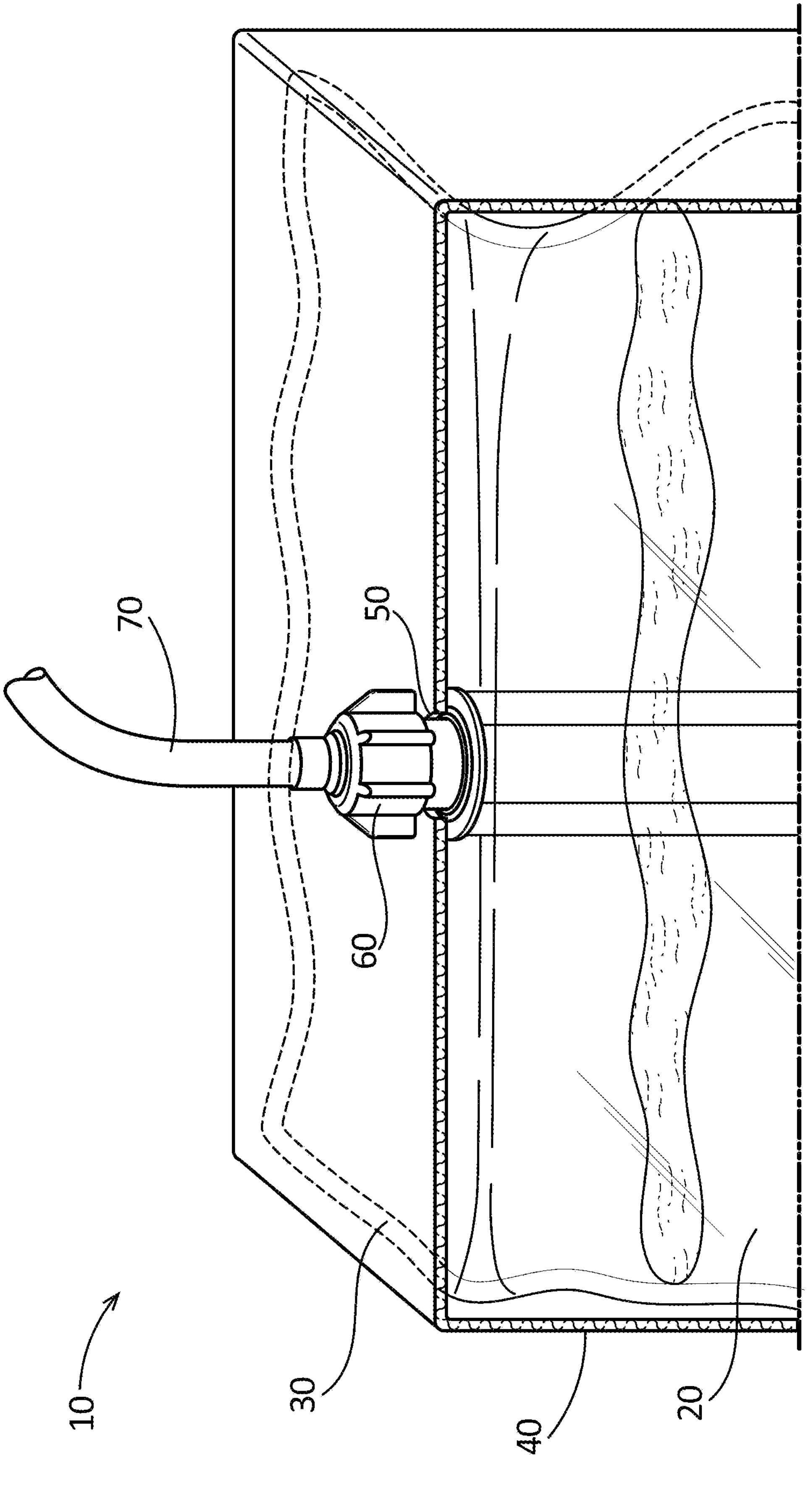
FIG. 1 is a partial perspective view of a known bag in box container and valve.

Referring now to the drawings in which like numbers refer to like elements throughout the several views, FIG. 1 shows an example of a known bag in box container 10. As described above, the bag in box container 10 may have a volume of a fluid 20 positioned in a flexible pouch 30. The flexible pouch 30 is placed in a corrugated box 40 and the like. A bag spout 50 may be attached to the flexible pouch 30. The bag spout 50 may be mated with a quick disconnect coupling 60. The quick disconnect coupling 60 generally screws onto the bag spout 50. The quick disconnect coupling 60 may be attached to a hose 70 that is in communication with a beverage dispenser and the like.

Figure 2:
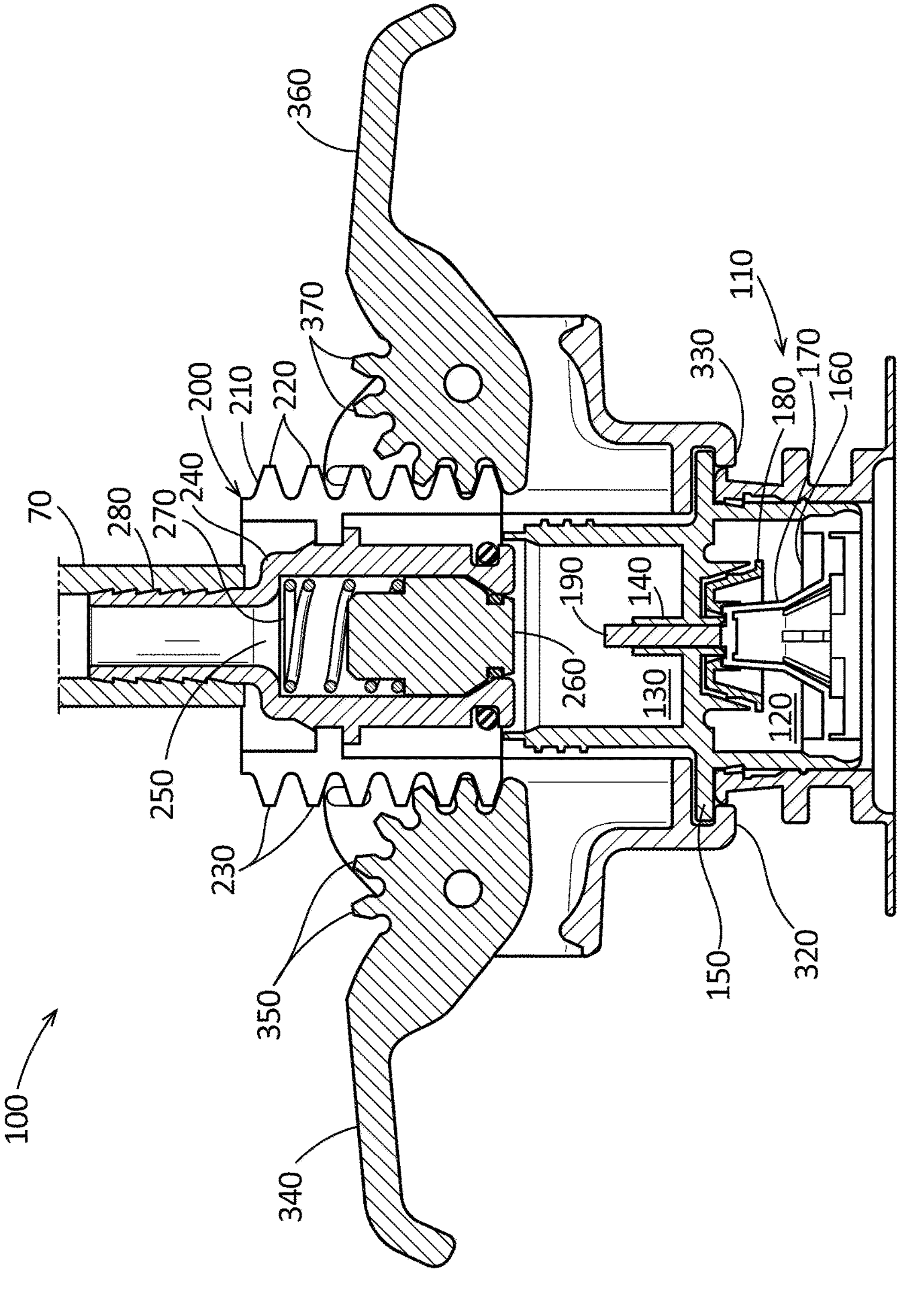
FIG. 2 is sectional view of the bag in box connector valve as may be described herein.
Figure 3:
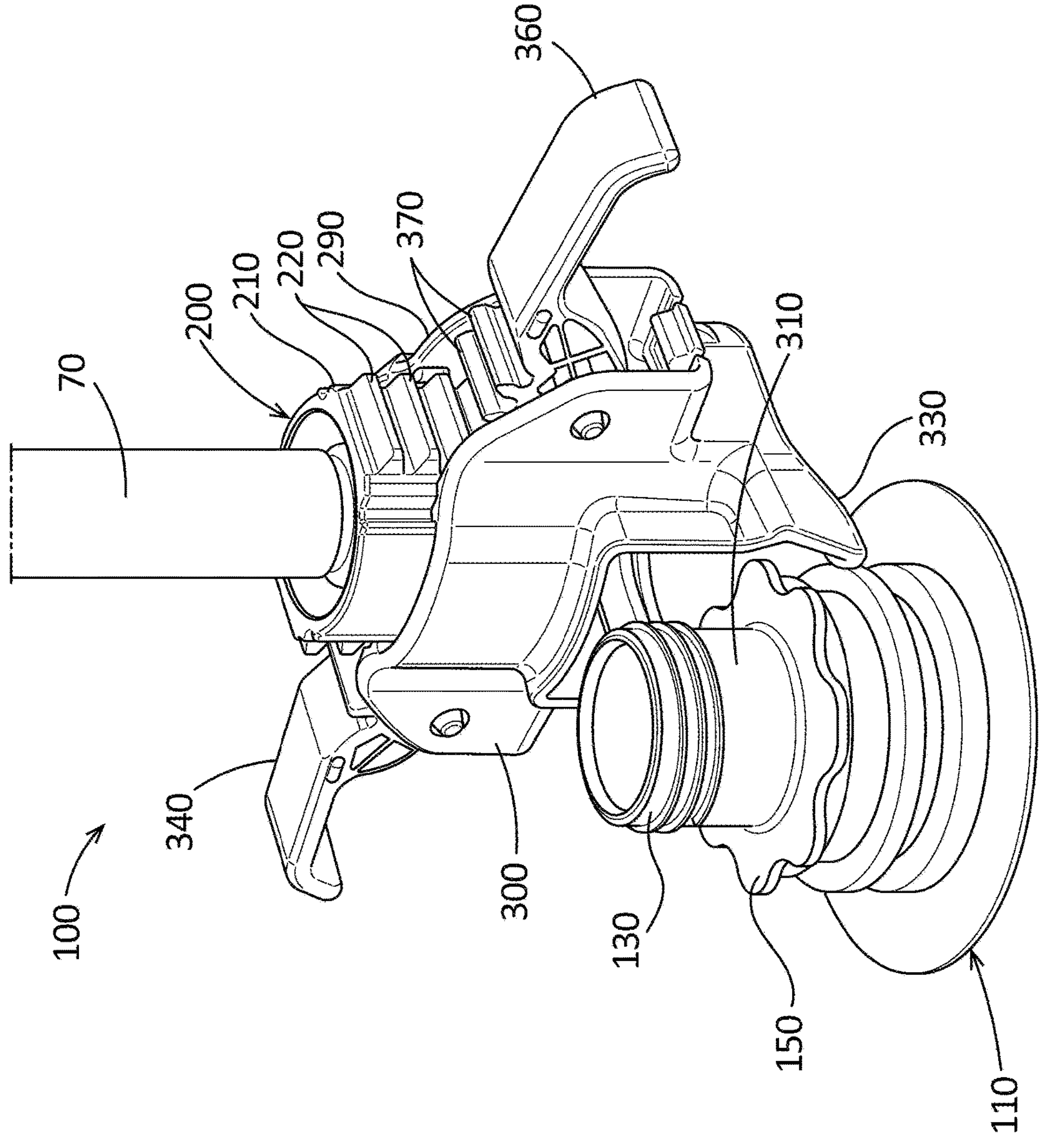
FIG. 3 is a perspective view of the bag in box connector valve of FIG. 2 in the open position.
Figure 4:
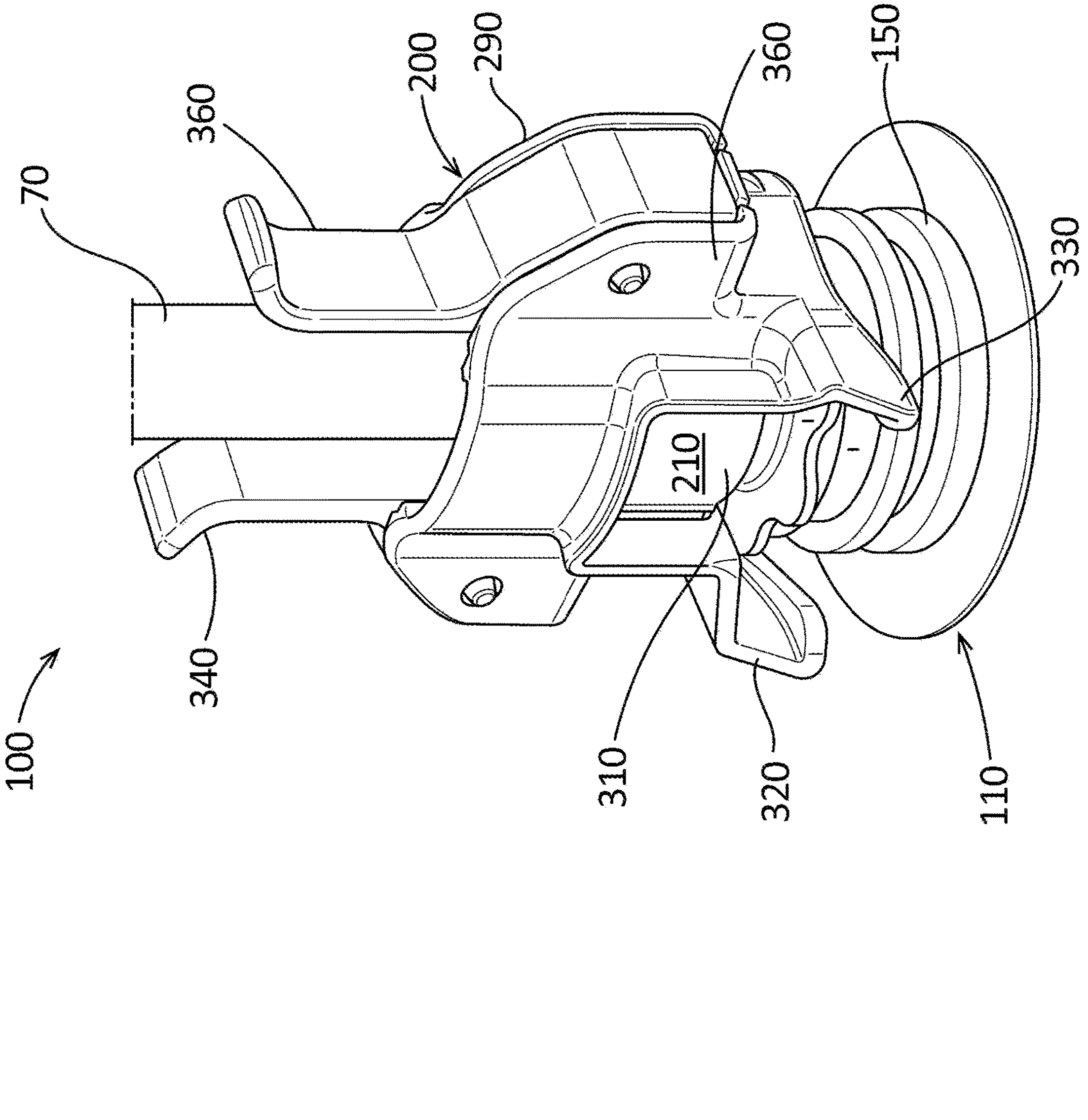
FIG. 4 is a perspective view of the bag in box connector valve of FIG. 2 in the closed position.

FIGS. 2-4 show an example of an improved bag in box connector valve 100 as may be described herein. The bag in box connector valve 100 may be used with the bag in box container 10 described above and with similar types of containers. The bag in box container 10 may have any suitable size, shape, and configuration. The bag in box container 10 and the bag in box connector valve 100 may be used with any type of fluid therein.

The bag in box connector valve 100 may include the bag spout 50 or similar types of spouts attached to the flexible pouch 30. The bag spout 50 may include a valve housing 110. The valve housing 110 may include a bottom chamber 120, an upper chamber 130, an internal stem 140 extending therebetween, and an outer connection flange 150. A bottom assembly 160 with a bottom assembly stem 170 and a poppet valve 180 with a poppet stem 190 may be position in the bottom chamber 120 of the bag spout 50 with the poppet stem 190 extending through the internal stem 140. Other components and other configurations may be used herein.

The bag in box connector valve 100 may include a quick disconnect ratchet coupling 200. The quick disconnect ratchet couple 200 may include a ratchet body 210. The ratchet body 210 may be largely tubular in shape and may include a first line of ratchet body teeth 220 on one side and a second line of ratchet body teeth 230 on an opposite side. A valve body 240 may be positioned within the ratchet body 210. The valve body 240 may have an internal pathway 250 with a valve poppet 260 biased by a coil spring 270 and the like. The internal pathway 250 may lead to a stem 280 for connection with the hose 70.

The quick disconnect ratchet coupling 200 may include a first side plate 290 and a second side plate 300. The first side plate 290 may be substantially flat. The second side plate 300 may have a spout opening 310 formed therein and a pair of lower connector arms, a first connector arm 320 and a second connector arm 330. The spout opening 310 may be configured to accommodate the upper chamber 130 of the valve housing 110 therein. The connector arms 320, 330 may be configured to accommodate the outer connection flange 150 of the valve housing 110 therein.

The quick disconnect ratchet coupling 200 further may include a pair of ratchet arms, a first ratchet arm 340 with a first line of ratchet arm teeth 350 and a second ratchet arm 360 with a second line of ratchet arm teeth 370. The ratchet arm teeth 350, 370 are configured to cooperate with the ratchet body teeth 220, 230 of the ratchet body 210 to raise and lower the ratchet body 210. Other components and other configurations may be used herein.

In use, the valve housing 110 of the bag spout 50 is connected to the flexible pouch 30 and the quick disconnect ratchet coupling 200 is connected to the hose 70. The quick disconnect ratchet coupling 200 is slid over the valve housing 110 and aligned in place via the outer connection flange 150 of the valve housing 110 sliding into place within the connector arms 320, 330 of the quick disconnect ratchet coupling 200. The ratchet arms 340, 360 may be swung upward so as to drive the valve body 240 of the ratchet body 210 downwards. This motion forces the valve body 240 against the poppet stem 190 of the poppet valve 180 so as to raise the valve poppet 260 of the valve body 240 and open the internal pathway 250. The fluid 20 from the flexible pouch 30 may now flow through the hose 70 to the beverage dispenser or elsewhere. The quick disconnect ratchet couple 200 may be disengaged from the valve housing 110 by lowering the ratchet arm 340, 360.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A bag in box connection valve for a pouch spout connected to a flexible pouch of a bag in box, comprising:
- a ratchet body;
- the ratchet body being largely tubular in shape and comprising a pair of ratchet teeth lines with a first plurality of ratchet teeth;
- a valve body positioned within the ratchet body, the valve body having an internal pathway;
- a quick disconnect ratchet coupling;
- the quick disconnect ratchet coupling comprising a spout opening; and
- a pair of ratchet arms with a pair of ratchet arm teeth lines with a second plurality of ratchet teeth;
- wherein the pair of ratchet teeth lines and the pair of ratchet arm teeth lines cooperate to raise and lower the ratchet body onto the pouch spout positioned within the spout opening by maneuvering the pair of ratchet arms; and
- wherein swinging the pair of ratchet arms upward drives the valve body downward against a poppet stem of a poppet valve of the pouch spout to open the internal pathway of the valve body.

2. The bag in box connection valve of claim 1, wherein the valve body comprises a valve poppet within the internal pathway.

3. The bag in box connection valve of claim 2, wherein the valve poppet is biased by a coil spring.

4. The bag in box connection valve of claim 2, wherein the internal pathway leads to a stem.

5. The bag in box connection valve of claim 1, wherein the quick disconnect ratchet coupling comprises a first side plate and a second side plate.

6. The bag in box connection valve of claim 5, wherein the second side plate comprises the spout opening with a first connector arm and a second connector arm.

7. The bag in box connection valve of claim 6, wherein the first connector arm and the second connector arm are spaced apart to accommodate a valve housing of the spout therein.

8. The bag in box connection valve of claim 7, wherein the valve housing comprises a poppet valve therein.

9. A bag in box connection valve for a pouch spout connected to a flexible pouch of a bag in box, comprising:
- a ratchet body;
- the ratchet body comprising a pair of ratchet teeth lines with a first plurality of ratchet teeth;
- a quick disconnect ratchet coupling;
- the quick disconnect ratchet coupling comprising a spout opening; and
- a pair of ratchet arms with a pair of ratchet arm teeth lines with a second plurality of ratchet teeth;
- wherein the pair of ratchet teeth lines and the pair of ratchet arm teeth lines cooperate to raise and lower the ratchet body onto the pouch spout positioned within the spout opening by maneuvering the pair of ratchet arms; and
- wherein swinging the pair of ratchet arms upwards drives a valve body of the ratchet body downward to force the valve body against a poppet stem of a poppet valve of the pouch spout.

* * * * *